United States Patent [19]

Suzuki

[11] Patent Number: 5,087,278
[45] Date of Patent: Feb. 11, 1992

[54] FILTER FOR GAS LIGHTER AND METHOD FOR PRODUCING THE SAME

[75] Inventor: Toshiyuki Suzuki, Hyogo, Japan

[73] Assignee: Yaka Feudor K.K., Himeji, Japan

[21] Appl. No.: 728,058

[22] Filed: Jul. 9, 1991

Related U.S. Application Data

[63] Continuation of Ser. No. 458,514, Dec. 28, 1989, abandoned.

[51] Int. Cl.$^5$ .............................................. B01D 39/20
[52] U.S. Cl. ...................................... 55/523; 155/524; 501/80
[58] Field of Search .......................... 55/487, 523, 524; 501/80

[56] References Cited

U.S. PATENT DOCUMENTS

| | | | |
|---|---|---|---|
| 3,256,105 | 6/1966 | Alford et al. | 501/80 |
| 4,101,262 | 2/1978 | Neyauet | 431/344 |
| 4,244,898 | 1/1981 | Bamdypadhyay et al. | 501/80 X |
| 4,332,550 | 6/1982 | Baumann | 431/344 |
| 4,343,704 | 8/1982 | Brockmeyer | 501/80 X |
| 4,370,285 | 1/1983 | Pluck et al. | 501/80 X |
| 4,894,160 | 1/1990 | Abe et al. | 55/523 X |
| 4,902,314 | 2/1990 | Mizukami et al. | 55/523 X |

Primary Examiner—Charles Hart
Attorney, Agent, or Firm—Beveridge, DeGrandi & Weilacher

[57] ABSTRACT

Forming a filter for a gas lighter using a sintered porous ceramic, and adjusting the flow rate of gas through gas passages formed by interparticle pores of ceramic. There will be no change in the flame length even in the use of the gas lighter over a long period, thereby enhancing the safety of the gas lighter.

35 Claims, 2 Drawing Sheets

FILTER FOR GAS LIGHTER AND METHOD FOR PRODUCING THE SAME

This application is a continuation of application Ser. No. 07/458,514, filed Dec. 28, 1989, now abandoned.

BACKGROUND OF THE INVENTION

1. Field of the Invention

The present invention relates to a filter disposed in the interior of a burner portion of a gas lighter to adjust the flow rate of gas and a method for producing same.

2. Description of the Prior Art

Gas lighters are provided with an adjusting valve for adjusting the flow rate of gas. Particularly, in conventional disposable plastic gas lighters, the said adjusting valve is constructed so that LPG (liquefied petroleum gas) as fuel permeates into a filter such as a urethane foam filter which is compressed to an appropriate extent. And the flow rate of gas is adjusted by adjusting the compression ratio of the filter.

However, in such a filter as a urethane foam filter, not only an average pore diameter is relatively large, but also the scatter in pore diameters is large, so the flame length is not constant. Further, there occur changes in the flame length because of poor chemicals resistance against LPG, etc.

For the purpose of solving this problem, for example U.S. Pat. No. 4,101,262 proposes the use of a microporous membrane formed of polypropylene as the filter material. This microporous membrane, having a pore diameter of about $0.1 \sim 1 \ \mu m \times 0.01 \ \mu m \times 0.1 \ \mu m$ and a thickness of $20 \sim 30 \ \mu m$, is said to exhibit a molecular sieve effect such that when fuel containing n-butane as a main component or fuel containing isobutane as a main component is used, only a vaporized portion of liquefied gas is allowed to pass through the membrane, while the liquid portion is not allowed to pass through the membrane.

As to chemicals resistance against LPG, etc., the polypropylene filter is superior to conventional urethane foam filters, but in the use over a long period its chemicals resistance is not considered satisfactory.

Further, the polypropylene filter is required to be as thin as 20 to 30 $\mu$m in order to retain its function as a molecular sieve. Consequently, the handling thereof is inconvenient, and when it is incorporated in a lighter mechanism, the number of parts and that of assembling steps increase, resulting in increase of the cost.

Additionally, although this can be said of conventional filters at large, not limited to polypropylene filters, there easily occurs a spitting phenomenon in which liquefied gas flows in a liquid state out of the filter. This is presumed to be because of insufficient supply of vaporization heat at the time of vaporization of the liquefied gas. Upon occurrence of such spitting phenomenon, the flame length pulsates, and particularly a large pulsation between long and short flames is dangerous.

On the other hand, sintered metals are extremely good in chemicals resistance. However, when a sintered metal filter is press-fitted in a lighter at the time of incorporating the filter into a lighter, the pores of the filter will be crushed by the resulting compressive force, resulting in deterioration or scatter in the gas transmitting function. There is the problem of gradual increase in flame length during use of the filter. This may be because a too high thermal conductivity promotes the vaporization of LPG. Further, sintered metals having pores not larger than 2.0 $\mu$m which size is suitable for the function as a filter are difficult to be obtained probably because the metal particles are easily fused to each other. This is also one of the causes of obstructing the practical application of sintered metal filters.

SUMMARY OF THE INVENTION

Having made extensive studies for overcoming the above-mentioned drawbacks of the conventional filters for gas lighter, the present inventor found that the use of a sintered porous ceramic as the filter material ensures a stable flame length even in the use over a long period and makes deformation or breakage difficult at the time of incorporating the filter into a gas lighter because of high strength, thus affording excellent effects in point of safety and productivity of gas lighters. In this way the present inventor accomplished the present invention.

It also turned out that a porous ceramic obtained using a powder of spherical particles is desirable in point of strength improvement and flame length stabilization, the said powder being obtained by passing a fine fireproof powder of a metal oxide through a high-temperature atmosphere and thereby melting the powder into spherical particles. The present invention was completed from this standpoint.

A ceramic filter affords a stable flame length in an upright state of a gas lighter in which it is incorporated, but when the gas lighter is brought down sideways, the flame length tends to increase. In the case where the lighter is used for the purpose of ignition to tobacco, there will arise no special problem because usually it is used in an upright state. Actually, however, gas lighters will be used in various other modes. For example, when a lighter is used in a mounted state to a hair curler or a curling iron, which mode of use is often adopted in Europe and America, the lighter is often brought down sideways.

If a suction core, e.g. a porous polyethylene core, is connected to the underside of a filter as in conventional gas lighters, there will be no increase of the flame length even when the gas lighter in which the filter is incorporated is brought down sideways. However, it is necessary to use not only the suction core itself but also a supporting member for the core. Besides, it is necessary to provide an additional step for mounting these components into the lighter. Thus, the use of such suction core results in increase in the manufacturing cost of the gas lighter and so is not desirable.

In view of the above-mentioned points the present invention selects a specific ceramic material as the filter material and improves it, thereby providing a filter which prevents the increase of flame length even without connection thereto of a suction core when a gas lighter with the filter is used in a sideways fallen state.

The above and other objects, features and advantages of the present invention will become more apparent from the following description and the drawings.

DESCRIPTION OF PREFERRED EMBODIMENT

Figure 1:
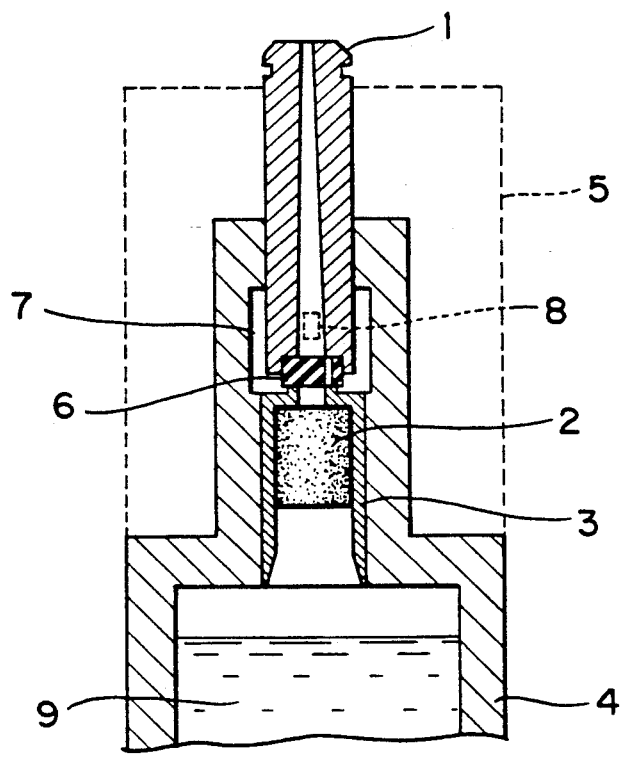
FIG. 1 is a schematic view of a filter embodying the present invention as incorporated in a gas lighter mechanism.

A first embodiment of the present invention is a filter for a gas lighter constituted by a sintered porous ceramic having interparticle pores.

A second embodiment of the present invention is a method for producing the said filter for a gas lighter, which method comprises adding a binder to ceramic particles containing not less than 80 wt% of particles which range in diameter from 0.5 to 10 $\mu$m, granulating the ceramic particles with the binder, then molding the resulting particles and thereafter calcining the thus-molded product.

The filter according to the first and second embodiments is constituted by a sintered porous ceramic in which interparticle pores serve as gas passages. The pore diameter thereof is not specially limited, but preferably it is in the range of 0.1 to 2.0 $\mu$m. If the pore diameter is smaller than 0.1 $\mu$m, the gas permeability of the filter will be deteriorated to the extent that the transmission of gas is insufficient unless the filter thickness is made small. Then, if the filter is made thin, its strength becomes low and hence it is no longer easy to handle it. On the other hand, if the pore diameter exceeds 2.0 $\mu$m, the flame length will become large, which is dangerous. A more preferable range of pore diameter is from 0.3 to 1.5 $\mu$m.

As the material of the sintered ceramic there may be used any of such ceramic materials as alumina, silica, alumina-silica, magnesia, spinel, carbon, silicon carbide and silicon nitride. Particularly, alumina, silica, and alumina-silica are preferred because they are superior in hydration resistance and sinterability.

The following is a preferred method for making the filter described above.

As a core material there is used a ceramic powder containing not less than 80 wt% of particles which range in diameter from 0.5 to 10 $\mu$m. A more preferred range of particle diameter is from 2 to 8 $\mu$m. These limitations on the particle diameter and proportion of the ceramic powder are necessary for controlling the pore diameter of the filter. In order to narrow the pore distribution range to obtain more controlled pores, it is desirable that the scatter in particle diameters be as small as possible.

It is preferable that the particles of the core material be spherical. This is because the number of contact points between spherical particles is small and so it is easy to obtain a porous body. When a porous body is obtained using square particles such as pulverized particles, a molded product prepared using such porous body is inferior in strength as compared with that prepared using spherical particles. In order for the powder to exhibit the effect of sphering its particles, it is necessary that the particles each have a major to minor axis ratio in the range of 1.3 to 1.0 as a sphering rate.

Next, a binder is added to the ceramic powder thus obtained, followed by kneading and granulation into granules of an appropriate diameter. As the binder there may be used one or more members selected from inorganic materials such as clay, water glass, phosphates, silicates, frit and cements as well as organic materials such as PVA, phenolic resins, furan resins, epoxy resins and wax emulsion. In the case where the ceramic powder comprises one or more of alumina, silica and alumina-silica, if clay is added as a binder, the clay will react with the components of the ceramic powder to form a mullite ($3Al_2O_3 \cdot 2SiO_2$) bond, but since this bond is effected through small contact points of ceramic particles, it is desirable in the control of interparticle pores.

According to a granulation method which may be used in the invention, the above binder is added in an amount of about 0.05-10 wt% to the ceramic powder, and an appropriate amount of water is added if necessary, then the powder with the binder is granulated to obtain secondary particles of 10-500 $\mu$m in diameter by a spray drying method or a rolling granulation method.

The secondary particles thus obtained are then subjected to molding. More specifically, the secondary particles are placed in a mold and pressurized at about 500–1,500 kg/cm$^2$, whereby the secondary particles are crushed and the resulting molded product is constituted by the primary particles. The reason why the secondary particles are used in the molding is that the packing density of the molded product becomes more uniform than that in direct molding of the ceramic powder and there can be obtained pores with less scatter in diameters.

The calcining temperature is determined optionally according to the material of the molded product. In the case where the material of the molded product is alumina, silica, or alumina-silica, it is preferable that the calcining temperature be in the range of 1,000° to 1,500° C.

The structure for mounting the filter to a gas lighter is the same as in the prior art. For example, as shown in the foregoing U.S. Pat. No. 4,101,262 and also in Japanese Patent Laid-Open Nos. 33426/85 and 50311/85, the filter mounting structure is positioned between a suction core and a nozzle and is supported by a stator or the like.

The filter according to the first and second embodiments exhibits the following functions and effects.

(1) Since the filter is constituted by a ceramic material, its chemicals resistance against liquid fuels such as LPG's (e.g. propane, isobutane, n-butane) is remarkably superior and the flame length is stable even in the use of the filter over a long period.

(2) There occurs no spitting phenomenon. This is probably because the ceramic material is superior in thermal conductivity as compared with organic materials such as polypropylene and hence there is supplied a sufficient vaporization heat necessary for liquid fuel to vaporize.

(3) Conventional organic materials could not afford pores not larger than several microns with little scatter in diameters due to fusion-bonding between particles, while the use of a ceramic material in the present invention can afford interparticle pores of a controlled pore distribution, for example not larger than 2 $\mu$m, whereby the flame length is more stabilized.

Metallic materials have also been proposed as filter materials, but they have not afforded fine interparticle pores such as those in the present invention also due to fusion-bonding between particles.

(4) In the case of metals and organic materials, there is fear of their deformation and breakage, so their handling is not easy in the preparation of products having a very small size and a high dimensional accuracy. On the other hand, sintered ceramics do not involve such problem because they are superior in strength, and can be easily incorporated in the flow of automation of a gas lighter manufacturing process, thus improving the productivity of gas lighters.

Thus, according to the present invention there can be provided in high productivity a gas lighter filter of high safety which always ensures a stable flame length. The filter is suitable for a disposable gas lighter for which quality and productivity are required particularly strongly.

Within the scope of the present invention, the invention is not limited to the above embodiments. The gas lighter mechanism in which the filter of the invention is to be incorporated is not specially limited, either. For example, the filter of the invention is applicable to a flame non-adjust type lighter with a suction core or a flame adjust type lighter. Further, the shape of a nozzle and that of a burner unit are not specially limited, either.

(EXAMPLES)

Working examples in the first and second embodiments of the present invention and comparative examples will be described below and also shown in annexed Table 1.

Examples 1-13

As ceramic powders, as core materials, there were used alumina ($Al_2O_3$ 99%), silica ($SiO_2$ 99%) and alumina-silica ($Al_2O_3$ 72%, $SiO_2$ 29%). These ceramic powders, after the addition of binders, were each kneaded and then granulated into secondary particles 40-60 $\mu$m in diameter by means of a spray dryer, which particles were then formed into a filter shape of 3.0 mm dia. by 4.5 mm at a pressure of 1,000 kg/cm$^2$ by means of a rotary press. The shaped products thus obtained were calcined for 3 hours at a heat-up rate of 50° C./hr.max. temp.

In Example 13 wherein water glass was used in place of clay as the binder, the pore diameter is larger than those in the other Examples. In Example 7 wherein a pulverized powder was used as it was, the scatter in flame lengths is larger than in the other examples in which there were used spherical particles. This is probably because it was difficult to control pores.

Though not shown in the table, with respect to Examples 2 to 5, when the core powders were not granulated into secondary particles but were directly subjected to pressure molding, the packing density in the molding was low and the resulting filter was large in pore diameter and inferior in strength.

Comparative Example

As the filter material there was used a conventional microporous film of polypropylene.

The filters obtained were markedly inferior in point of scatter in flame lengths as compared with the working Examples of the present invention. The pulsation of flame caused by spitting phenomenon was observed in most of the filters. Besides, in some of the filters, the difference between long and short flames was large and thus there was a problem in point of safety. Though not shown in the table, moreover, it was necessary to handle the filters carefully because of low strength thereof, resulting in that the gas lighter manufacturing process was complicated and the yield was poor.

On the other hand, the filters obtained in the foregoing working Examples were high in strength and free of the above problems, and it turned out that the gas lighter productivity was improved 8-12%.

A third embodiment of the present invention is a method for producing a filter for a gas lighter which method comprises melt-sphering a fine fireproof powder of a metal oxide by passing it through a high-temperature atmosphere, adding an appropriate amount of a binder to the resulting spherical particles, thereafter molding the spherical particles with the binder and then calcining the molded product.

First, how to produce the powder of spherical particles will be described. The starting material is a fine fireproof powder of a metal oxide. Examples of metal oxides which may be used in the present invention include alumina, silica, alumina-silica, magnesia, cordierite, spinel, zirconia, titania, calcium titanate, and calcium zirconate. These metal oxides may be used each alone or in combination of two or more. Particularly, alumina, silica and alumina-silica are preferred because of superior hydration resistance and sinterability. Examples of alumina are sintered alumina, electrofused alumina, calcined alumina, and natural corundum. Examples of silica are siliceous stone, quartz, silica sand, and fused quartz. Examples of alumina-silica are bauxite, silimanite, and mullite.

The fine fireproof powder is adjusted to a particle diameter of, say, not larger than 300 $\mu$m, more preferably not larger than 100 $\mu$m, by pulverization for example and thereafter passed through a high-temperature atmosphere and thereby melt-sphered. In order for the fine fireproof powder to be melted to a satisfactory extent, it is preferable that the powder be fed directly into a high-temperature flame and thereby sphered. In this case, the fine fireproof powder need not be melted completely up to the interior thereof. It is sufficient for its surface portion to be melted into a generally sphered shape at a sphering rate in the range of 1.3 to 1.0 in terms of a major to minor axis ratio.

The high-temperature atmosphere is formed using a high-temperature flame produced by a gas burner which uses as fuel a flammable gas such as, for example, propane, hydrogen, butane, or acetylene.

Out of the spherical particles obtained by passing the fine fireproof powder through the high-temperature atmosphere, it is those not larger than 100 $\mu$m in diameter that are suitable for use in the present invention. This particle size is obtained by passing a fine fireproof powder which has been adjusted beforehand to a particle size close to the said particle size through the high-temperature atmosphere, or by screening the particles having the particle size in question out of those which have been melt-sphered. Or a dust collector may be utilized because fine spherical particles are easily collected into a filter bag at the time of melt-sphering.

Next, an appropriate amount of a binder is added to the spherical particles thus obtained, followed by molding and subsequent calcining. The binder is not specially limited. Examples are inorganic binders such as clay, bentonite, water glass, phosphates, silicates, frit, and cements, as well as organic binders such as PVA, phenolic resins, furan resins, epoxy resins, and wax emulsion. These binders may be used each alone or in combination of two or more. In the case where the ceramic powder comprises one or more of alumina, silica and alumina-silica, if clay or bentonite is added as a binder, it will react with the components of the spherical powder particles to form a mullite ($3Al_2O_3 \cdot 2SiO_2$) bond, but since this bond is effected through small contact points of ceramic particles, it is desirable in the control of interparticle pores. The amount of the binder to be added is, for example, in the range of 0.05 to 10 wt% relative to the spherical powder particles. Whether an appropriate amount of water is to be added or not depends on the kind of the binder used.

In the molding, the mixture prepared above may be pressurized directly, but preferably secondary particles of, say, 10 to 500 μm are obtained beforehand by a spray drying method or a rolling granulation method and then pressurized. According to the latter, as compared with the direct pressurizing of the former, the packing density of the resulting molded product is uniform and there is little scatter in pore diameters which pores serve as gas passages in the filter obtained.

In this case, there is adopted a pressure of, say, 500 to 1,500 kg/cm$^2$. Even in the use of secondary particles, they are crushed upon the application of pressure and so the resulting molded product is constituted by primary particles.

The calcining temperature is determined optionally according to the material of the molded product. In the case where the material of the molded product is alumina, silica, or alumina-silica, the calcining temperature is preferably in the range of 1,000° to 1,500° C.

The filter obtained according to this embodiment is constituted by a sintered porous ceramic having interparticle pores which serve as gas passages. The pore diameter is not specially limited, but is preferably in the range of 0.1 to 2.0 μm. If the pore diameter is smaller than 0.1 μm, the gas permeability of the filter will be deteriorated to the extent that the transmission of gas is insufficient unless the filter thickness is made small. Then, if the filter is made thin, its strength becomes low and hence it is no longer easy to handle it. On the other hand, if the pore diameter exceeds 2.0 μm, the flame length will become large, which is dangerous. It is more preferable that the pore diameter be in the range of 0.3 to 1.5 μm.

It is necessary that the filter be a porous body having pores which serves as gas passages. Using a fine fireproof powder, it is easy to obtain a porous sinterate, but if the fine fireproof powder is of square particles such as a pulverized powder, the packing density is low probably because of poor fluidity. And if the pressure is increased at the time of molding for the purpose of increasing the packing density, there will arise problems such as the breakage of the particles. Moreover, the flame is less stable in point of length probably because of a marked scatter in pore diameters which pores serve as gas passages.

On the other hand, the powder used in the third embodiment of the present invention is of spherical particles, which are high in packing density. Besides, the flame is remarkably superior in the stability of its length probably because of less scatter in pore diameters which pores are formed by inter particle gaps. Gas lighters are used not only for the purpose of ignition to tobacco but also used as a heat source of hair curlers, etc. in Europe and America. In this case, the flame length in normal use is nearly 10 cm and so the stabilization of flame length is very effective in attaining the safeness and elimination of unpleasant feeling.

The powder of spherical particles used in the present invention is superior in sinterability probably because of the presence of fine crystals on the surface due to melt-sphering. Besides, the surface thereof is smooth because it has gone through melting. Consequently, the filter is high in strength although it is porous, and permits smooth passing of gas therethrough.

The structure for mounting the filter to a gas lighter is the same as in the prior art. For example, as shown in the foregoing U.S. Pat. No. 4,101,262 and also in Japanese Patent Laid-Open Nos. 33426/85 and 50311/85, the filter mounting structure is positioned between a suction core and a nozzle and is supported by a stator or the like.

According to the this third embodiment of the present invention there are attained the following function and effect in addition to the foregoing functions and effects (1)–(4).

(5) The particles which constitute the filter are superior in sinterability probably because of the presence of fine crystals on the surface due to melt-sphering, and the filter is high in strength despite of being porous. Moreover, the melt sphering makes the particle surfaces smooth and hence makes the transmission of gas smooth, thus ensuring a stabler flame length.

(Examples)

Working examples in the third embodiment of the present invention and comparative examples will be described below and also shown in annexed Table 2. But it is to be understood that the third embodiment of the invention is not limited thereto.

In each of Examples 1 to 10 there was used a powder of spherical particles obtained by passing a fine fireproof powder through a high-temperature flame and thereby melt-sphering the particles thereof. The melt-sphering was performed by feeding the fine fireproof powder in a predetermined amount into a high-temperature flame (about 2,000°–2,200° C.) consisting of propane and oxygen.

As to the starting materials used in the Examples, the "melt-sphered alumina powder" is sintered alumina, the "melt-sphered silica powder" is siliceous stone, the "melt-sphered alumina-silica powder" is sintered mullite, and the "pulverized alumina powder" is sintered alumina.

In Comparative Example 1 a pulverized fine fireproof powder was used as it was.

In Examples 1–10 and Comparative Example 1, the ingredients shown in the table were formed into filters of 3.0 mm dia. by 4.5 mm at a pressure of 1,000 kg/cm$^2$ by means of a rotary press. The filters thus obtained were dried at 110° C. for 20 hours and thereafter calcined for 3 hours at a heat-up rate of 50° C./hr. max temp.

In Comparative Example 2 there was used a conventional microporous film of polypropylene as the filter material.

The filters obtained in the Comparative Examples are markedly inferior in chemicals resistance and conspicuous in the scatter in flame lengths as compared with the filters obtained in the working Examples of the present invention. The pulsation of flame caused by a spitting phenomenon was observed in most of the filters of the Comparative Examples; besides, in some of them, the difference between long and short flames was marked and thus there was a problem in point of safety. Though not shown in the table, moreover, it was necessary to handle the comparative filters carefully because of low strength, resulting in that the gas lighter manufacturing process became complicated correspondingly and the yield was low. On the other hand, the filters obtained in the working Examples were of high strength and free of aforementioned problem, and it turned out the productivity of gas lighters was improved by 8–12%.

Although some metal oxides were used as starting materials in the working Examples, the present inventor has confirmed the same effect as above also in the use of other metal oxides.

Now, fourth and fifth embodiments of the present invention will be described.

The fourth embodiment is a filter for a gas lighter characterized in that at least the underside of a columnar body formed of a porous ceramic having gas permeability is coated with a porous fluorine resin film.

The fifth embodiment is a method suitable for the production of the filter of the fourth embodiment, characterized in that at least the underside of a columnar body formed of a porous ceramic having gas permeability is coated with a dispersion of a fluorine resin and thereafter heated.

When a ceramic filter not having a suction core was brought down sideways, LPG permeated into the filter in a liquid state, and it turned out that this was the cause of increase in flame length. Propane or butane as a main component of LPG expands to a volume about 250 times as large as its original volume upon vaporization. Due to the difference in viscosity, the filter passing speed of liquid is lower than that of gas, but liquid affords a flame length 2 to 7 times that of gas. That is, in order to prevent the change in flame length even when a ceramic filter with a suction core not connected thereto is brought down sideways, it is necessary to subject the ceramic filter to a lyophobic LPG treatment such that the filter permits LPG to pass therethrough in a gaseous state but does not permit the passage thereof in a liquid state.

Having made further studies, the present inventor found that this problem could be overcome by coating the underside of a ceramic filter with a porous fluorine resin film.

It has already been known that a porous fluorine resin film permits gas to pass therethrough easily but makes the passage of liquid difficult. In the fourth and fifth embodiments of the present invention, such characteristic of a porous fluorine resin film is combined with a ceramic filter.

In order to obtain a porous fluorine resin film it is necessary to heat a fluorine resin at a temperature of about 200°-500° C. In the case where the filter body is formed of an organic material, it cannot withstand such heat treatment. In the case of a ceramic filter like the present invention, there will be no change in the quality of the filter even upon heating, so it is easy to form a porous fluorine resin film. Moreover, the porous film is bonded firmly to the filter and there is no fear of its separation from the filter at the time of mounting the filter into a lighter or even in the use of the filter over a long period. This is probably due to entanglement of the porous film with the pores of the filter.

There was tried coating a filter of a sintered metal with a porous fluorine resin film. But when incorporated in a lighter, the filter underwent a compressive force induced by a sleeve jig which holds the filter, with the result that the pores of the filter were crushed and the pores of the porous fluorine resin coating on the filter were closed. Besides, there arose a problem of lowering in bonding force of the porous fluorine resin film due to shrinkage of the filter body.

Thus, in the fourth and fifth embodiments of the invention there is utilized the characteristic of a porous fluorine resin film that it permits gas to pass therethrough but makes the passage of liquid difficult, and in combination of this characteristic with a ceramic filter there could be attained effects incapable of being anticipated from the prior art.

The filter of the present invention will be described below in more detail together with an example of how to produce it.

Examples of the filter body material include alumina, silica, alumina-silica, magnesia, spinel, carbon, silicon carbide, silicon nitride, and glass.

In the production of the filter body, using any of the materials just exemplified above, there is obtained a powder of spherical particles and/or a pulverized powder adjusted so that the particles not larger than 20 $\mu$m, preferably in the range of 0.5 to 10 $\mu$m, occupy 80 wt% or more, to which was then added a suitable binder, followed by pressure molding.

As the binder there may be used one or more selected from inorganic binders such as, for example, clay, water glass, phosphates, silicates, frit and cements as well as organic binders such as, for example, PVA, phenolic resins, furan resins, epoxy resins and wax emulsion. The amount of the binder to be used can be determined optionally according to the kind of the binder used, but preferably it is in the range of 0.1 to 20 wt% in terms of outer percentage relative to the ceramic powder.

Molding may be performed by directly pressurizing the ceramic powder after adding the binder thereto, or by first granulating the ceramic powder into particles of about 10 to 500 $\mu$m in diameter according to a spray drying method or a rolling granulation method and then molding the particles obtained. The pressure is in the range of 500 to 1,500 kg/cm$^2$. Such molding of the particles obtained by granulation is advantageous in that the packing density of the resulting molded product is uniform as compared with that of a molded product obtained without going through such granulation and there are obtained pores with less scatter in diameters.

In order for the filter to exhibit its function, the pore diameter of the filter is adjusted to, for example, not larger than 5 $\mu$m, preferably in the range of 0.1 to 2 $\mu$m. The adjustment of the pore diameter can be effected mainly by adjusting the particle size of the ceramic powder. If the pores are too small, the gas permeability of the filter will be unsatisfactory, while if the pores are too large, there will arise problems such as lowering in strength of the filter and the clogging of the filter caused by the entry therein of a fluorine resin at the time of coating the filter with a porous fluorine resin film.

It is preferable that the molded product obtained be subjected to a calcining treatment for the improvement of strength and the formation of pores.

The shape of the molded product should be cylindrical. The size thereof depends on the flame length required for a gas lighter, but, for example, it is in the range of 1.0 to 3.0 mm in diameter and 1.4 to 4.0 mm in height. If the size is too small, it becomes difficult to handle the molded product. If the cylindrical shape is made smaller in the bottom diameter, that is, if the side face thereof is tapered so as to be divergent upwards, the filter is tapered, thereby facilitating its insertion into the filter supporting jig.

In the filter according to the fourth and fifth embodiment of the present invention, at least the underside of the filter body thus obtained is coated with a porous fluorine resin film. According to a suitable example of the coating method, a dispersion (suspension) of a fluorine resin containing water and a surfactant is applied to the filter body by spraying, brush coating, or by dipping the filter body in the dispersion. It is preferable for the dispersion to have a solids content of 5 to 70 wt%.

Thereafter, heating is made at a temperature not lower than 90° C., preferably 200° to 420° C. By this heating the fluorine resin is baked to form a coating layer as a porous film on the filter.

Examples of known fluorine resins are PVF (polyvinyl fluoride), PVdF (polyvinylidene fluoride), PTrFE (polytrifluoroethylene), and PTFE (polytetrafluoroethylene). Particularly, PTFE is preferred in the present invention because it can afford a porous film having stable pores.

The thickness of the porous fluorine resin film after baking should be, for example, in the range of 5 to 100 μm. If the dispersion is applied thick at a time, the coating layer may be cracked at the time of heating at some particular concentration of the dispersion. In this case, the thickness of the coating layer may be increased gradually by repeating the application of the dispersion and subsequent heating alternately in plural times, e.g. two or three times.

Figure 2:
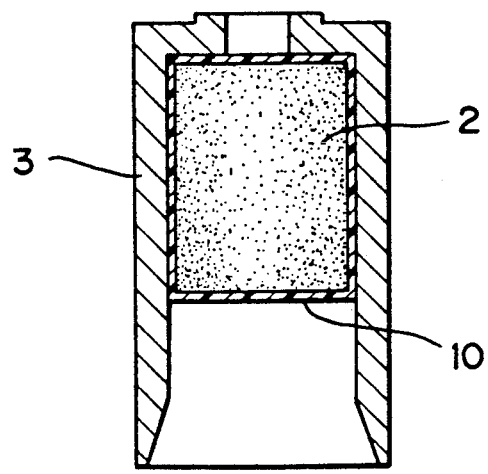
FIG. 2 is an enlarged view of a principal portion of FIG. 1.

FIG. 2 is a photograph (magnification: 3,000×) of the porous fluorine resin film after baked to the filter taken by a scanning type electron microscope. The same texture as that of the photograph is not always obtained because the texture of the porous film depends on the solids content of the dispersion, the kind of the surfactant used, heating conditions for the baking and the kind of the fluorine resin used, but what is common to all of the porous films formed according to the present invention is that the film assumes an entangled state of fibers and there are formed interfiber through holes.

The above baking method is known in forming the coating of a fluorine resin for the base with a view to improving heat resistance and attaining non-stickiness. There may be used the same fluorine resin, solvent and surfactant as in the conventional fluorine resin baking method.

As other conditions to be satisfied by the filter, the mounting of the filter into a gas lighter should be easy and the sealing between the filter and the filter supporting jig should be attained to a satisfactory extent. The sleeve jig is formed by a metal such as brass or aluminum or by a plastic material such as a nylon resin. The filter is press-fitted in the jig. In this case, if there is a gap of several μm between the filter and the sleeve jig, there will occur the leakage of gas, resulting in that the flame becomes unstable in its length.

Figure 3:
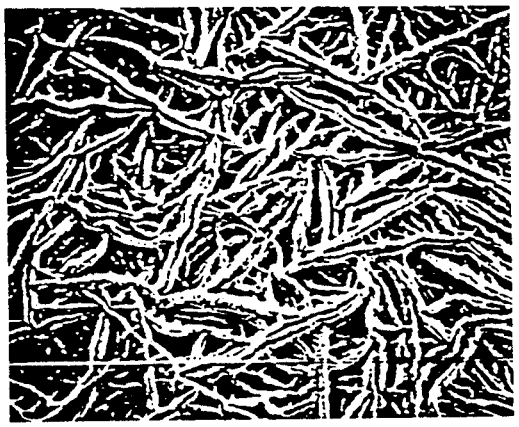
FIG. 3 is a microphotograph (magnification: 3,000×) showing a crystal structure of a porous fluorine resin film used as a coating for a ceramic filter.

It turned out that by coating the filter of the invention not only on the underside thereof but also on the side face thereof the filter could be mounted into a gas lighter easily and the problem related to sealing could be overcome. Since fluorine resins are extremely low in the coefficient of friction, they function as sealing materials and facilitate press-fitting of the filter into the sleeve jig. Moreover, although fluorine resins are poor in bonding property, since the filter body is porous and probably because a fibrous texture after heating is entangled with the filter pores as seen in the photograph of FIG. 3, the porous film formed by a fluorine resin is firmly bonded to the filter body and will never be peeled off even at the time of press-fitting of the filter into the sleeve jig.

Thus, in the present invention, not only the underside of the filter but also the side face thereof may be coated with the porous fluorine resin film. Although the coating on the underside of the filter and that on the side face thereof are for different purposes, the productivity of the filter is high because both coatings can be obtained using the same material.

If the porous fluorine resin coating is formed by dipping the filter in the fluorine resin dispersion, even the upper surface of the filter may be coated. In the present invention, however, as long as the underside and side face of the filter are coated, the effect of the coating is not lost even when the upper surface thereof is also coated.

FIGS. 1 and 2 schematically illustrate the filter of the invention as loaded into a lighter. In FIG. 1, the numeral 1 denotes a nozzle. When the lighter is in use, a flame is generated at the upper end of the nozzle 1. The numeral 2 denotes a filter; numeral 3 denotes a sleeve jig which supports the filter; and numeral 4 denotes an LPG storage tank. The filter 2 is connected together with the nozzle 1 to the tank 4 through the casing 5.

FIG. 2 is an enlarged view of the filter 2 portion, in which the underside and side face of the body of the filter 2 are coated with a porous fluorine resin film 10.

In using the lighter, the nozzle 1 is pushed up with a lever for example, whereby a rubber valve 6 which is integral with the nozzle is brought up to open the upper portion of the sleeve jig 3. Then, the gas which has risen through the filter 2 enters a gas holding portion 7, then passes through a through hole 8 formed in the lower end of the nozzle 1, enters the nozzle 1 and blows off from the upper end of the nozzle.

When the lighter is brought down sideways, an LPG 9 comes into contact in a liquid state with the underside of the filter 2, but the presence of the porous fluorine resin film allows only gas to enter the filter 1.

It goes without saying that the present invention relates to a filter and that the mechanism of a lighter is not limited to the illustrated one.

According to the fourth and fifth embodiments of the present invention there are attained the following functions and effects.

(1) Since at least the underside of the filter is coated with the porous fluorine resin film, even when the lighter is brought down sideways, the liquid of LPG is not passed through the filter, while the passage of only gas is allowed, so there is no fear of increase of the flame length.

(2) The fluorine resin coating permits the omission of a suction core which is used in conventional filters for gas lighter. Consequently, the suction core itself and a component for supporting the suction core are no longer needed, with the result that in the manufacture of gas lighters the number of parts and that of steps for mounting them are decreased.

(3) Although fluorine resins are poor in bonding property relative to the base, since the filter body is constituted by a porous ceramic, a porous fluorine resin film is firmly bonded to the ceramic filter probably because a fibrous texture of the porous film gets entangled with the porous ceramic.

(4) The ceramic filter, unlike sintered metal filters and organic material filters, is free of such problem as deformation or crushing of pores. Besides, the porous fluorine resin film provides a strong coating for the ceramic filter. Therefore, it becomes easy to incorporate the filter mounting step in an automation line in the manufacture of gas lighters.

According to the recent tendency, low-grade gas lighters called plastic lighters predominate, and how to reduce the manufacturing cost is an important subject. Therefore, the effect that the filter of the present invention affords a high productivity of lighters and attains the reduction in the number of components, as noted above, while maintaining a stable flame length, is very significant.

The following are working Examples in the fourth and fifth embodiments of the present invention and Comparative Examples.

Example 1

Silica of $SiO_2$ 95 wt% purity was finely pulverized to not larger than 10 μm in diameter by means of a jet mill, then 5 wt% clay and 2.5 wt% frit in terms of outer percentage were added as binders, followed by molding into a 3.0 mm dia. by 4 mm high cylinder by means of a rotary press. Thereafter, the cylinder was calcined at 1,100° C. to obtain a ceramic filter body. This filter body was found to have an average pore diameter of 0.9 μm and a gas permeability of $3.70 \times 10^{-4}$ ($cc/sec.cm/cm^2 \cdot 1/cmH_2O$).

On the other hand, there was prepared a dispersion (solids content: 60 wt%) of polytetrafluoroethylene (PTFE) containing 1 wt% of alkyl-allylpolyethylene glycol as a surfactant, using water as a solvent.

The dispersion prepared above was applied by brush coating to the underside and side face of the ceramic filter obtained above and thereafter heating was made while the temperature was raised gradually like 90° C.×30 min→200° C.×30 min→400° C.×30 min. As a result, there was obtained a porous fluorine resin coating having a thickness of 30 μm and a pore diameter of about 0.1 to 0.5 μm on the filter.

Example 2

Alumina of $Al_2O_3$ 98 wt% purity was finely 1 pulverized to not larger than 5 μm in diameter, then clay was added as a binder in an amount of 5 wt% in terms of an outer percentage. The resulting mixture was granulated into particles ranging in diameter from 30 to 50 μm by a spray drying method, followed by molding and subsequent calcining at 1,400° C. to obtain a ceramic filter body. This filter body was found to have an average pore diameter of 0.7 μm and a gas permeability of $3.0 \times 10^{-4}$ ($cc/sec.cm/cm^2 \cdot 1/cmH_2O$).

The filter body was dipped for 10 seconds in a dispersion (solids content: 65 wt%) of polytrifluoroethylene (PTrFE) and thereafter heated. As a result, there was formed on the filter body a porous fluorine resin coating having a thickness of 15 μm and a pore diameter of 0.2 to 0.4 μm.

Example 3

Raw materials of boric acid glass comprising $SiO_2$ 53 wt%, $B_2O_3$ 19 wt% and $Na_2O$ 17 wt% were finely pulverized to not larger than 10 μm, then frit was added as a binder in an amount of 3 wt% in terms of an outer percentage, followed by molding and subsequent calcining at 700° C. to obtain a ceramic filter body.

A dispersion of polytetrafluoroethylene (PTFE) was sprayed to the underside and side face of the filter body, followed by heating. As a result, there was formed on the filter body a porous fluorine resin coating having a thickness of 60 μm and a pore diameter of 0.5 to 0.8 μm.

In each of the above Examples 2 and 3, the size of the filter body, how to perform molding, the solvent and surfactant of the dispersion, and heating conditions after the application of the dispersion were the same as in Example 1.

Comparative Example 1

The ceramic filter body obtained in Example 1 was used as it was. That is, this ceramic filter does not have such a fluorine resin coating as in the present invention.

Comparative Example 2

A filter was obtained using a sintered metal having an average pore diameter of 50 μm. The size and shape thereof were the same as in the working Examples.

Comparative Example 3

A filter was obtained using a urethane foam 3 mm dia. by 2 mm high.

In each of the above working and comparative examples, five hundred filters were produced and mounted into LPG gas lighters, then tested with suction cores not connected. In an endurance test conducted over a three month period, the filters obtained in the working Examples of the present invention were stable in the flame length in both an upright state and a sideways brought-down state.

On the other hand, when the filters of Comparative Example 1 were used in a sideways brought-down state, their flame lengths increased to two to four times as large as their flame lengths in an upright state of the filters.

The filters of Comparative Example 2 did not have optimal pores as filter pores because of the use of the sintered metal. As a result, although they were of the same diameter as that of the filters obtained in the working Examples of the present invention, their flame lengths were two to three times as large as the flame lengths of the filters of the invention. There also arose the problem that when they were mounted into gas lighters, their pores were crushed by a compressive force of the filter supporting sleeve jig. Moreover, since the filters of this comparative example did not have a porous fluorine resin coating, their flame lengths further increased to two times or so when used in a sideways brought-down state. This was dangerous.

As to the filters of Comparative Example 3, their flame lengths were changed in three months to 1.5 to 2 times as large as the original flame lengths probably because of their inferior chemicals resistance. Because of organic material filters, they are low in strength and there easily occur deformation and breakage at the time of mounting into gas lighters.

In the filters of Examples 1 to 3, since they have the porous fluorine resin coating not only on the undersides thereof but also on their side faces, they can be mounted into gas lighters with less friction between them and the sleeve jigs which support them, and the gap between both is sealed. Besides, since the filters are formed of a porous ceramic, the porous fluorine resin coatings are firmly bonded to the filters, and that the same porous fluorine resin coating as that on the underside of each filter can be used for the coating on the side face thereof is very desirable also from the standpoint of improvement in the productivity of gas lighters using those filters.

TABLE 1

Annexed

Examples in the first and second embodiments of the present invention

TABLE 1-continued

| | | | Annexed | | | | | | |
|---|---|---|---|---|---|---|---|---|---|
| | | | 1 | 2 | 3 | 4 | 5 | 6 | 7 |
| Composition in Filter Production (wt %) | Spherical alumina powder | Particle dia. 8~15 μm | 50 | | | | | | |
| | Spherical alumina powder | Particle dia. 2~8 μm | 20 | 70 | 100 | | | | |
| | Spherical alumina powder | Particle dia. 0.5~5 μm | 30 | 30 | | | | | |
| | Spherical silica powder | Particle dia. 2~5 μm | | | | | 50 | | |
| | Spherical silica powder | Particle dia. 0.5~3 μm | | | | | 50 | | |
| | Spherical alumina-silica powder | Particle dia. 4~8 μm | | | | | | 90 | 100 |
| | Spherical alumina-silica powder | Particle dia. 1~5 μm | | | | | | 10 | |
| | Pulverized alumina powder | Particle dia. 4~8 μm | | | | | | | 100 |
| | Clay | | (5) | (5) | (2.5) | (5) | (5) | (5) | (5) |
| | Water glass | | | | | | | | |
| | PVA | | (0.5) | (0.5) | (0.5) | (0.5) | (0.5) | (0.5) | (0.5) |
| Calcining temperature (°C.) | | | 1400 | 1400 | 1400 | 1050 | 1450 | 1400 | 1400 |
| Quality of Filter | Pore dia. of filter (μm) | Distribution range | 0.5~0.9 | 0.5~1.2 | 1.1~1.3 | 0.7~1.5 | 1.3~1.8 | 1.6~1.9 | 0.1~2.2 |
| | | Average | 0.7 | 0.9 | 1.2 | 0.9 | 1.5 | 1.7 | 1.2 |
| | Porosity (%) | | 32.0 | 30.0 | 35.0 | 28.5 | 34.5 | 35.0 | 25.0 |
| | Chemicals resistance (change of flame length with time)*1 | | +2% | +1% | +0% | +2% | +0% | −2% | +3% |
| | Scatter in flame lengths*2 | | ○ | ○ | ⊙ | ○ | ○ | ⊙ | △ |
| | Strength of filter (kg/cm$^2$)*3 | | 960 | 880 | 760 | 920 | 915 | 820 | 650 |
| | Spitting phenomenon*4 | | non | non | non | non | non | non | non |

| | | | Examples in the first and second embodiments of the present invention | | | | | | Comparative |
|---|---|---|---|---|---|---|---|---|---|
| | | | 8 | 9 | 10 | 11 | 12 | 13 | Example |
| Composition in Filter Production (wt %) | Spherical alumina powder | Particle dia. 8~15 μm | | | | | | | Polypropylene filter |
| | Spherical alumina powder | Particle dia. 2~8 μm | 90 | 50 | 70 | 100 | | 50 | |
| | Spherical alumina powder | Particle dia. 0.5~5 μm | | | 30 | | | | |
| | Spherical silica powder | Particle dia. 2~5 μm | | 50 | | | 100 | 50 | |
| | Spherical silica powder | Particle dia. 0.5~3 μm | | | | | | | |
| | Spherical alumina-silica powder | Particle dia. 4~8 μm | | | | | | | |
| | Spherical alumina-silica powder | Particle dia. 1~5 μm | | | | | | | |
| | Pulverized alumina powder | Particle dia. 4~8 μm | 10 | | | | | | |
| | Clay | | (5) | (5) | (2.5) | (7.5) | (5) | | |
| | Water glass | | | | | | | (3) | |
| | PVA | | (0.5) | (0.5) | (0.5) | (0.5) | (0.5) | | |
| Calcining temperature (°C.) | | | 1400 | 1100 | 1600 | 1000 | 900 | 1400 | |
| Quality of Filter | Pore dia. of filter (μm) | Distribution range | 0.7~1.8 | 1.2~1.7 | 0.05~0.8 | 0.2~1.4 | 0.03~0.8 | 0.2~5.0 | |
| | | Average | 1.5 | 1.4 | 0.3 | 0.9 | 0.2 | 3.1 | — |
| | Porosity (%) | | 27.0 | 33.0 | 32.0 | 27.0 | 33.0 | 34.0 | — |
| | Chemicals resistance (change of flame length with time)*1 | | 0% | 4% | +2% | +1% | +2% | +5% | 32% |
| | Scatter in flame lengths*2 | | ○ | ⊙ | ○ | ○ | ○ | ○ | X |
| | Strength of filter (kg/cm$^2$)*3 | | 705 | 805 | 1120 | 720 | 700 | 620 | — |
| | Spitting phenomenon*4 | | non | non | non | non | non | non | occurred |

In the item "Composition in Filter Production", the parethesized numerical values are in outer weight percentages.
*1 Chemicals resistance: The change of flame length in six months after mounting of the filters into gas lighters is shown in %.
*2 Scatter in flame lengths: 1,000 filters were produced in each example and the scatter in flame lengths was checked in LPG gas lighters. The range of scatter in flame lengths was evaluated in % with respect to a reference flame length of 40 mm. The room temperature was held at 25° C. during the measurement. ⊙ within ±8% ○ within ±20% △ within ±30% x over ±30%
*3 Strength of filter: Compressive strength was measured.
*4 Spitting phenomenon: 1,000 filters in each example were checked.

TABLE 2

| | | | Annexed | | | | | |
|---|---|---|---|---|---|---|---|---|
| | | | Examples in the third embodiment of the present invention | | | | | |
| | | | 1 | 2 | 3 | 4 | 5 | 6 |
| Composition | Melt-sphered | Particle | 50 | 50 | 30 | 30 | 10 | |

TABLE 2-continued

| | | | Annexed | | | | | |
|---|---|---|---|---|---|---|---|---|
| in Filter Production (wt %) | alumina powder Melt-sphered | dia. 8~15 μm Particle | 50 | 30 | 70 | 70 | 90 | |
| | alumina powder Melt-sphered | 0.5~8 μm Particle | | | | | | 30 |
| | silica powder Melt-sphered | dia. 2~5 μm Particle | | | | | | 70 |
| | silica powder Melt-sphered | dia. 0.5~2 μm Particle | | | | | | |
| | alumina-silica powder Melt-sphered | dia. 4~8 μm Particle | | | | | | |
| | alumina-silica powder Pulverized alumina powder | dia. 1~5 μm Particle dia. 4~8 μm | | | | | | |
| | Pulverized alumina powder | Particle dia. 1~4 μm | | | | | | |
| | Clay | | (10) | (5) | (5) | | (5) | (5) |
| | Frit | | | | | (5) | (5) | |
| | PVA | | (0.5) | (0.5) | (0.5) | (0.5) | (0.5) | (0.5) |
| Calcining temperature (°C.) | | | 1400 | 1500 | 1000 | 1400 | 1400 | 1500 |
| Quality of Filter | Pore dia. of filter (μm) | Distribution range | 0.2~0.7 | 0.3~0.9 | 0.8~1.6 | 1.0~1.8 | 0.5~0.7 | 0.5~0.9 |
| | | Average | 0.5 | 0.7 | 1.2 | 1.5 | 0.6 | 0.7 |
| | Porosity (%) | | 38.2 | 37.7 | 37.2 | 37.0 | 39.0 | 38.5 |
| | Chemicals resistance (change of flame length with time)*1 | | +1% | +1% | 0% | −1% | 0% | 0% |
| | Scatter in flame lengths*2 | | O | O | O | O | O | O |
| | Strength of filter (kg/cm$^2$)*3 | | 1210 | 1300 | 1012 | 1250 | 1200 | 1305 |
| | Spitting phenomenon*4 | | non | non | non | non | non | non |

| | | | Examples in the third embodiment of the present invention | | | | Comparative Example | |
|---|---|---|---|---|---|---|---|---|
| | | | 7 | 8 | 9 | 10 | 1 | 2 |
| Composition in Filter Production (wt %) | Melt-sphered alumina powder | Particle dia. 8~15 μm | | | | 50 | | Polypropylene filter |
| | Melt-sphered alumina powder | Particle dia. 0.5~8 μm | | | | 50 | | |
| | Melt-sphered silica powder | Particle dia. 2~5 μm | 50 | | | | | |
| | Melt-sphered silica powder | Particle dia. 0.5~2 μm | 50 | | | | | |
| | Melt-sphered alumina-silica powder | Particle dia. 4~8 μm | | 30 | 50 | | | |
| | Melt-sphere alumina-silica powder | Particle dia. 1~5 μm | | 70 | 50 | | | |
| | Pulverized alumina powder | Particle dia. 4~8 μm | | | | | 50 | |
| | Pulverized alumina powder | Particle dia. 1~4 μm | | | | | 50 | |
| | Clay | | (5) | (2.5) | (5) | (5) | (5) | |
| | Frit | | (2.5) | (2.5) | | | | |
| | PVA | | (0.5) | (0.5) | (0.5) | (0.5) | | |
| Calcining temperature (°C.) | | | 1550 | 1400 | 1450 | 1400 | 1400 | |
| Quality of Filter | Pore dia. of filter (μm) | Distribution range | 0.6~1.1 | 0.5~1.2 | 0.8~1.4 | 1.3~1.9 | 0.1~2.5 | |
| | | Average | 0.9 | 0.7 | 1.2 | 1.8 | 0.4 | |
| | Porosity (%) | | 39.3 | 38.1 | 38.8 | 38.5 | 23.2 | |
| | Chemicals resistance (change of flame length with time)*1 | | 0% | 0% | +1% | +1% | +3% | +32% |
| | Scatter in flame lengths*2 | | O | O | O | O | Δ | X |
| | Strength of filter (kg/cm$^2$)*3 | | 1350 | 1230 | 1250 | 1200 | 710 | — |
| | Spitting phenomenon*4 | | non | non | non | non | non | non |

In the item "Composition in Filter Production", the parethesized numerical values are in outer weight percentages.
*1 Chemicals resistance: The change of flame length in six months after mounting of the filters into gas lighters is shown in %.
*2 Scatter in flame lengths: 1,000 filters were produced in each example and the scatter in flame lengths was checked in LPG gas lighters. The range of scatter in flame lengths was evaluated in % with respect to a reference flame length of 40 mm. The room temperature was held at 25° C. during the measurement. O within ±8% Δ within ±30% x over ±30%
*3 Strength of filter: Compressive strength was measured.
*4 Spitting phenomenon: 1,000 filters in each example were checked

What is claimed is:

1. A filter for a gas lighter, constituted by a sintered porous ceramic having interparticle pores, wherein the particles of the porous ceramic are spherical.

2. A filter for a gas lighter according to claim 1, wherein the interparticle pores of said sintered porous ceramic are in the range of 0.1 to 2.0 μm in diameter.

3. A filter for a gas lighter according to claim 1, wherein said sintered porous ceramic is a sintered alumina, silica or alumina-silica.

4. A filter as claimed in claim 1, wherein the pore diameter is in the range of about 0.3 to 1.5 micrometers.

5. A filter as claimed in claim 1, wherein the ceramic is selected from the group consisting of alumina, silica, alumina-silica, magnesia, spinel, carbon, silicon carbide and silicon nitride.

6. A method for producing a filter for a gas lighter, which method comprises adding a binder to a ceramic powder of spherical particles containing not less than 80% by weight of particles which are in the range of 0.5 to 10 μm in diameter, granulating the resulting mixture to obtain secondary particles, then molding the resulting secondary particles, and calcining the molded product.

7. A method according to claim 6, wherein the ceramic powder comprises one or more selected from alumina, silica and alumina-silica powders.

8. A method according to claim 7, wherein the calcining temperature is in the range of 1,000° C. to 1,500° C.

9. A method for producing a filter as claimed in claim 6, wherein at least 80% of the spherical particles have a diameter in the range of about 2 to 8 micrometers.

10. A method for producing a filter as claimed in claim 6, wherein the particles have a major to minor axis ratio in the range of about 1.3 to 1.0 as a sphering rate.

11. A method for producing a filter as claimed in claim 6, wherein the binder is one or more of the binders selected from the group consisting of clay, water glass, phosphates, silicates, frit, cements, PVA, phenolic resins, furan resins, epoxy resins, and wax emulsion.

12. A method for producing a filter according to claim 6, wherein the binder is added in an amount of about 0.05 to 10 weight percent based on the ceramic powder.

13. A method for producing a filter according to claim 6, wherein the secondary particles have a diameter in the range of about 10 to 500 micrometers.

14. A method for producing a filter according to claim 6, wherein the secondary particles are molded at a pressure of about the 500 to 1500 kg/cm².

15. A method for producing a filter according to claim 6, wherein the calcining temperature is in the range of about 1000° C. to 1500° C.

16. A method for producing a filter for a gas lighter, which method comprises passing a fine fireproof powder of a metal oxide through a high-temperature atmosphere to melt and sphere the powder, adding an appropriate amount of a binder to the resulting spherical particles of the powder, molding the resulting mixture, and thereafter calcining the molded product.

17. A method for producing a filter as claimed in claim 16, wherein the fine fireproof powder of a metal oxide is selected from the group consisting of alumina, silica, alumina-silica, magnesia, cordierite, spinel, zirconia, titania, calcium titanate, and calcium zirconate.

18. A method for producing a filter as claimed in claim 16, wherein after sphering, the fine fireproof powder particles have a major to minor axis ratio in the range of about 1.3 to 1.0 as a sphering rate.

19. A method for producing a filter as claimed in claim 16, wherein the particle diameter of the fine fireproof powder is not larger than 300 micrometers.

20. A method for producing a filter as claimed in claim 16, wherein the particle diameter of the fine fireproof powder is not larger than 100 micrometers.

21. A method for producing a filter as claimed in claim 16, wherein the binder is selected from the group consisting of clay, bentonite, water glass, phosphates, silicates, frit, cements, PVA, phenolic resins, furan resins, epoxy resins, and wax emulsion.

22. A method for producing a filter according to claim 16, wherein the binder is added in an amount of about 0.05 to 10 weight percent based on the powder.

23. A method for producing a filter according to claim 16, wherein the particles in the molding step have a diameter in the range of about 10 to 500 micrometers.

24. A method for producing a filter according to claim 16, wherein the molding step takes place at a pressure of about 500 to 1500 kg/cm².

25. A method for producing a filter according to claim 16, wherein the calcining temperature is in the range of about 1000° C. to 1500° C.

26. A method for producing a filter according to claim 16, wherein the calcined product has a pore diameter in the range of about 0.1 to 2.0 microns.

27. A method for producing a filter according to claim 16, wherein the calcined product has a pore diameter in the range of about 0.3 to 1.5 microns.

28. A method for producing a filter according to claim 16, wherein the high temperature atmosphere is in the range of about 2000° C. to 2200° C.

29. A filter for a gas lighter, having a cylindrical body formed of a porous ceramic having gas permeability, at least the underside of said cylindrical body being coated with a porous fluorine resin film.

30. A filter for a gas lighter according to claim 29, wherein both the underside and the peripheral side face of said cylindrical body are coated with said porous fluorine resin film.

31. A method for producing a filter for a gas lighter, which method comprises coating at least the underside of a cylindrical body formed of a porous ceramic having gas permeability with a dispersion of a fluorine resin, and thereafter heating the thus-coated cylindrical body.

32. A method for producing a filter according to claim 31, wherein the temperature during the heating step is in the range of about 200° C. to 500° C.

33. A method for producing a filter according to claim 31, wherein the temperature during the heating step is about 200° C. to 420° C.

34. A method for producing a filter according to claim 31, wherein the fluorine resin is selected from the group consisting of polyvinyl fluoride, polyvinylidene fluoride, polytrifluoroethylene, and polytetrafluoroethylene.

35. A method for producing a filter according to claim 31, wherein the thickness of the fluorine resin after heating is in the range of about 5 to 100 micrometers.

* * * * *